(12) United States Patent
McCormick

(10) Patent No.: US 10,290,203 B2
(45) Date of Patent: May 14, 2019

(54) INTERFACE FOR COMMUNICATING SENSOR DATA TO A SATELLITE NETWORK

(71) Applicant: Peter E. McCormick, Dallas, TX (US)

(72) Inventor: Peter E. McCormick, Dallas, TX (US)

(73) Assignee: Lasso Technologies, LLC, Dallas, TX (US)

( * ) Notice: Subject to any disclaimer, the term of this patent is extended or adjusted under 35 U.S.C. 154(b) by 751 days.

(21) Appl. No.: 14/031,167

(22) Filed: Sep. 19, 2013

(65) Prior Publication Data

US 2014/0085102 A1 Mar. 27, 2014

Related U.S. Application Data

(63) Continuation-in-part of application No. 12/210,717, filed on Sep. 15, 2008, now abandoned.

(60) Provisional application No. 61/703,706, filed on Sep. 20, 2012.

(51) Int. Cl.
*H04Q 9/00* (2006.01)
*G08C 17/02* (2006.01)
*H04B 7/185* (2006.01)

(52) U.S. Cl.
CPC ............. *G08C 17/02* (2013.01); *H04B 7/185* (2013.01); *H04Q 9/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,656,127 B1* | 2/2010 | Shutt | ................... | H01M 10/425 320/134 |
| 2003/0016128 A1* | 1/2003 | Lutz | ....................... | G08C 19/00 340/517 |
| 2003/0114980 A1* | 6/2003 | Klausner | ................ | G01C 21/26 701/32.7 |
| 2005/0065667 A1* | 3/2005 | Weineck | ............ | B64D 45/0015 701/3 |
| 2005/0083197 A1* | 4/2005 | Glenn | .................... | G08B 25/10 340/539.22 |
| 2007/0140199 A1* | 6/2007 | Zhao | ................. | H04W 52/0229 370/338 |
| 2013/0197725 A1* | 8/2013 | O'Dell | .................. | B64F 5/0045 701/14 |

* cited by examiner

*Primary Examiner* — Nabil H Syed
*Assistant Examiner* — Cal J Eustaquio
(74) *Attorney, Agent, or Firm* — Locke Lord LLP

(57) ABSTRACT

A communication interface, and method thereof, allows a single communication device to accept data from multiple different types of sensors for transmission to a communication network. The communication interface is capable of inputting data from many types of sensors and outputting the data directly to the communication device. The communication interface translates or otherwise converts a variety of sensor data into a common message format that is appropriate and acceptable to the communication device. Such a communication interface allows many different types of sensing applications, particularly in distant and remote locations, to use a common communication device to communicate with a central server.

18 Claims, 9 Drawing Sheets

```
Interface unit acts as the master over the satellite modem
You program how many hours elapse between reporting intervals    Example Payload XML Interface unit uses truncated Message type /x15 to satellite modem which includes GPS location
and user data  Payload length is 16 bytes <?xml version="0 /" encoding="UTF-7"?>
<stuMessages xmlns9xsi="http9.www w2 org.1//0.XMLSchema-instance"
xsi9noNamespaceSchemaLocation="http9.cody glpconnect com.XSD.StuMessage_Rev0_/_0 xsd"
timeStamp="01./6.1/01 079 7913 GMT" messageID="afa8ca7/10470//476ccfceb48d105" >
 <stuMessage>
  <esn>0-010087<.esn>
  <unixTime>02323014/2<.unixTime>                                                5/1
  <gps>N<.gps>
  <payload length="16" source="pc"
  encoding="hex" >/x/01EBBE1BB1BB///0011223344556677 88AA0BABC/ ABC0ABC1FE//
  <.paylod>
 <.stuMessage>
<.stuMessages>
```

FIG. 6B

```
                                                                              5/2
/x/0 1E BB E1 BB 1B B/ // 00 11 22 33 44 55 66 77 88 AA  0B    AB  C/ AB  C0 AB  C1 FE
 hdr| latitude longitude |msg | CntPerHr |    TotalCounts    |degC|Analog/ |Analog0|Analog1|Inputs
```

FIG. 6C

INTERFACE FOR COMMUNICATING SENSOR DATA TO A SATELLITE NETWORK

CROSS-REFERENCE TO RELATED APPLICATIONS

This application for patent claims the benefit of priority to, and hereby incorporates by reference, U.S. Provisional Application Ser. No. 61/703,706, entitled "Interface for Communicating Sensor Data to a Satellite Network," filed Sep. 20, 2012, and is a continuation-in-part of U.S. Non-Provisional application Ser. No. 12/210,717, entitled "Wireless Item Locator," filed Sep. 15, 2008, which is incorporated herein by reference in its entirety.

BACKGROUND OF THE INVENTION

Technical Field of Invention

The embodiments disclosed and taught herein relate generally to a system, and method thereof, of communicating data from different types of sensors to a satellite network. In some implementations, the embodiments disclosed herein include an interface for translating data from disparate types of sensors into a format usable by a satellite modem for transmitting the data to a satellite network.

Description of Related Art

Remote sensors are available for gathering numerous types of data. Examples of remote sensors include sensors for logging data on fluid flow, pressure, temperature, pH level, salinity level, viscosity, tank level, and the like. Other types of data that may be collected via remote sensors include vehicle tracking data, vehicle location data, vehicle movement data, presence or absence of cargo, and the like. Engine data may also be tracked, including fault codes, engine RPM, engine hours, vehicle speed, odometer, fuel level, miles per gallon, and the like. Generator performance, water treatment plants, and solar panel farms are common applications. Environmental data may be gathered as well, along with a host of other types of data.

Depending on the type of data being collected, a different sensor unit may be needed that may employ a different data interface, which may include different pin connections and signaling protocols. These different data interfaces may encompass various digital interfaces, analog interfaces, frequency counters, event counters, voltage interfaces, current interfaces, and the like. Vehicle tracking sensors, for example, often use the SAE J1939 or the OBD2 interface. Other sensors may use RS-232, SCI, I2C, PCI, Modbus and the like.

The remote sensor units report their data back to a server at a central location for processing and analysis. Typically, the data from the sensor unit is transmitted using a wireless communication network, such as a cellular communication network or a satellite communication network. But because each type of data is usually provided in a different data format according to the data interface used by the sensor unit, a dedicated communication device, such as a dedicated modem, is typically provided with the sensor unit that is designed to accept data specifically from that sensor unit. Such a dedicated modem typically cannot be used with a another, different type of sensor data. In general, no communication device can accept data from another type of sensor for which it was not designed.

Accordingly, what is needed is a system, and method thereof, that allows one communication device, such as a modem or other communication devices, to accept data from multiple different types of sensors for transmission to a communication network.

SUMMARY OF THE INVENTION

The embodiments disclosed and taught herein provide a communication interface, and method thereof, that allows a single communication device to accept data from multiple different types of sensors for transmission to a communication network. The disclosed communication interface is capable of inputting data from many types of sensors and outputting the data directly to the communication device. The communication interface translates or otherwise converts a variety of sensor data into a common message format that is appropriate and acceptable to the communication device. Such a communication interface allows many different types of sensing applications, particularly in distant and remote locations, to use the same communication device to communicate with a central server.

In some embodiments, the communication interface can receive and process on-board vehicle data for transmission by the communication device over a communication network. Numerous other types of sensor data with different sensor protocols may also be received and processed by the communication interface. Examples of sensor protocols that may be translated by the communication interface include digital, analog, event counters, frequency counters, low voltage (e.g., 0-3.3 V) inputs, low current (e.g., 0-20 mA) inputs, intermediate voltage (e.g., 12-24 V) inputs, SAE J1939, OBD2, RS-232, SCI, I2C, Modbus, PCI, and the like.

Examples of sensor data that may be processed by the communication interface disclosed herein include fluid flow, pressure, temperature, pH level, salinity level, chlorides, viscosity, tank level, and the like. Other types of sensor data that may be processed by the communication interface include vehicle tracking data, vehicle location data, vehicle movement data, presence or absence of vehicle cargo, and the like. Engine data may also be processed by the communication interface, including fault codes, engine RPM, engine hours, vehicle speed, odometer, fuel level, miles per gallon, generator health, solar panel farms, and the like.

In some embodiments, the communication interface disclosed herein may be used to facilitate solar panel charging of batteries. Control systems, such as the TriStar control system available from Morningstar Corp., may be used to monitor the performance of the solar panels and the batteries. Often, backup generators near the solar panels are used to maintain power when the solar panels are not sufficient to recharge the batteries. The communication interface may use the Modbus communication protocol to monitor the solar panels and the backup generator. The Battery charging voltage, instantaneous amp hours, total amp hours, amps, load, temperature, hours, and overcurrent faults from the solar panels may be read over Modbus. Generator hours, oil pressure, voltage, load, operational status, whether the generator properly kicked in when there was insufficient solar power, and any failures may also be monitored by the communication device described herein.

Other types of data, such as environmental data, may also be processed as well, along with a host of other types of data known to those having ordinary skill in the art. All of this data may be monitored and reported via a communication network.

In one exemplary implementation, the communication network is a satellite network and the communication device is a satellite modem, such that the communication interface disclosed herein provides an interface for the sensor unit to the satellite modem. Of course, those having ordinary skill in the art will understand that the principles and teachings disclosed herein are equally applicable to other types of communication networks, such as cellular and the like, without departing from the scope of the disclosed embodiments.

DESCRIPTION OF THE DRAWINGS

The foregoing and other aspects of the disclosed embodiments will become apparent from the following detailed description and upon reference to the drawings, wherein:

FIGS. 6A-6C illustrate an exemplary configuration interface and file format for an exemplary satellite modem used with the satellite communication interface according to the disclosed embodiments.

DESCRIPTION OF DISCLOSED EMBODIMENTS

The drawings described above and the written description of specific structures and functions below are presented for illustrative purposes and not to limit the scope of what has been invented or the scope of the appended claims. Nor are the drawings drawn to any particular scale or fabrication standards, or intended to serve as blueprints, manufacturing parts list, or the like. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual, real-world commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention or the appended claims.

As alluded to above, the disclosed embodiments relate to a communication interface that allows one communication device, such as a satellite modem, to accept data from multiple different types of sensors for transmission to a communication network, such as a satellite network. In such an arrangement, the communication interface disclosed herein may be a sensor-modem interface unit configured to convert data from a myriad of sensor units to a format that may be suitable for transmission by the satellite modem. Following is a more detailed description of an exemplary implementation of the sensor-modem interface unit.

Figure 1C:
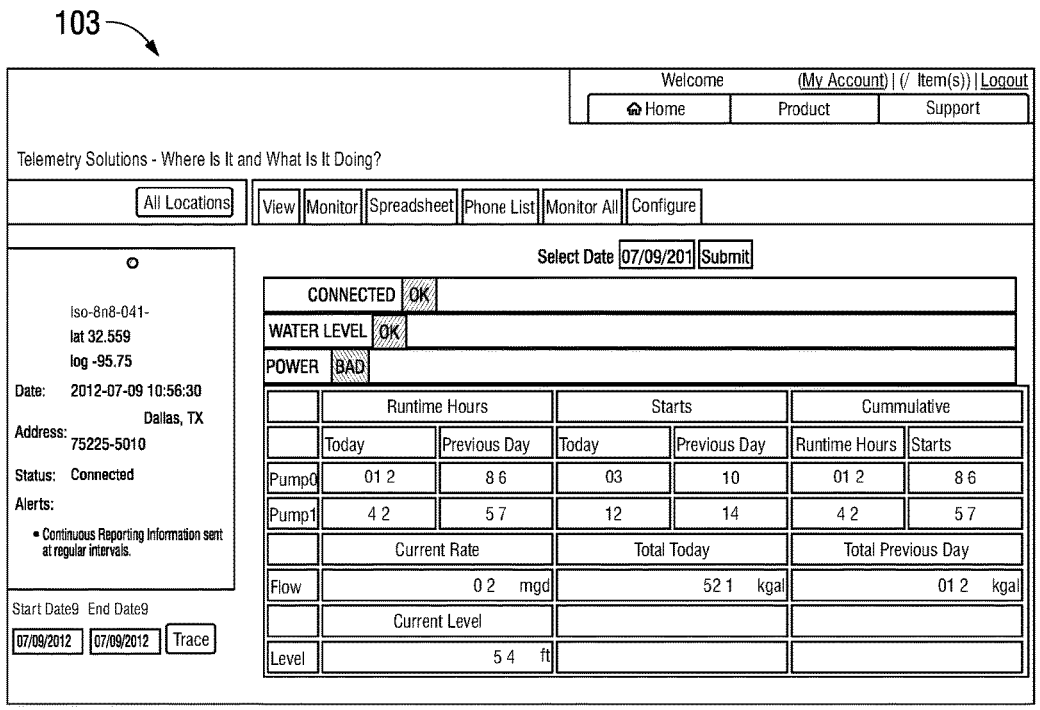
FIGS. 1A-1D illustrate an overview of an exemplary monitoring and tracking system using remote sensors according to the disclosed embodiments.
Figure 1D:
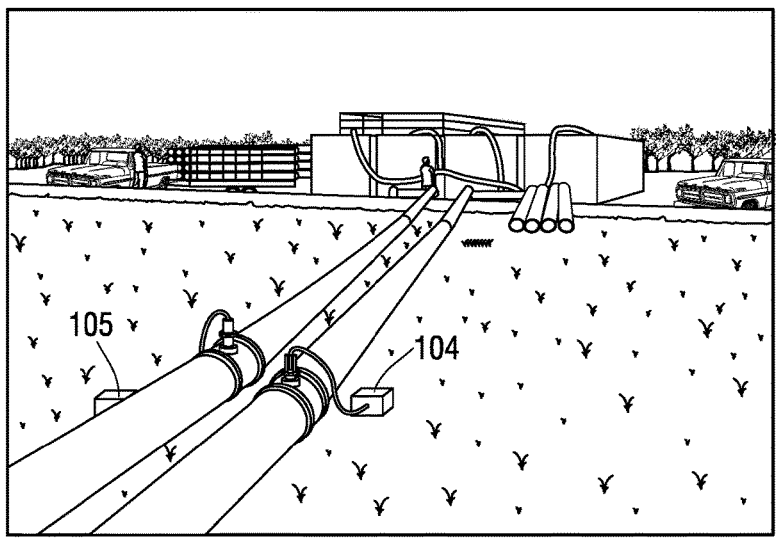
Figure 1A:
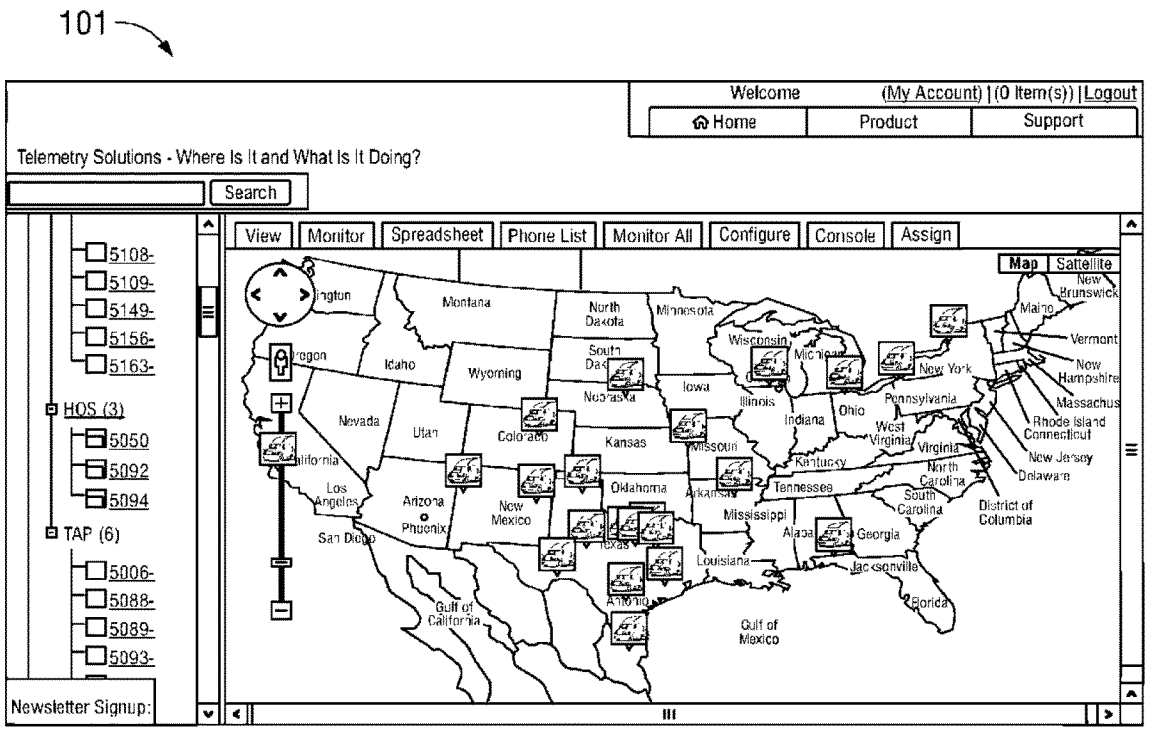

Referring now to FIG. 1A, an exemplary map 101 shows all of the assets that are being tracked for a particular user according to the disclosed embodiments. Each thumbnail icon on the map 101 indicates the presence of one or more remote sensor units at that location on the map. Each sensor unit may be provided with a wireless communication adapter for transmitting data collected by the sensor unit over a wireless network back to a central Web server. Global Positioning System (GPS) data for the sensor unit may also be reported by the wireless communication adapter and interpreted by the Web server. In some embodiments, any asset, as listed on the left side of the map 101, may be selected to drill down and provide more details on a specific asset. The map 101 may also be designed so that positioning the mouse over any thumbnail icon reveals the details of that asset and what it is doing.

Figure 1B:
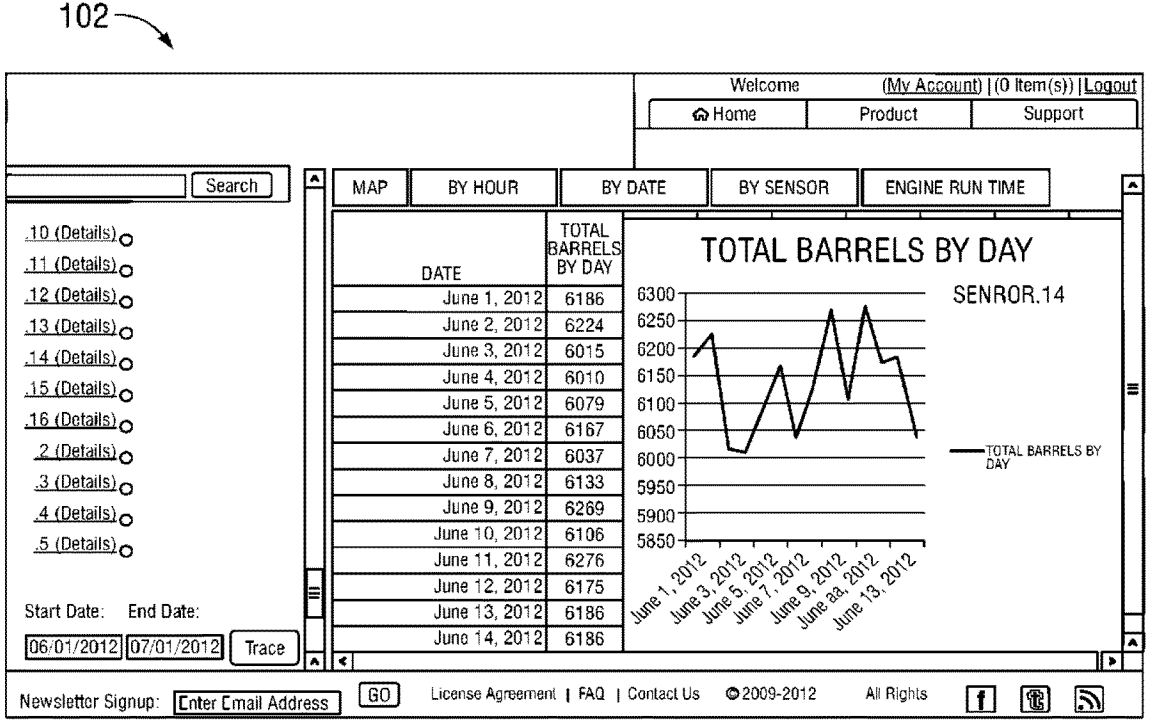
Figures 1C, 1D:
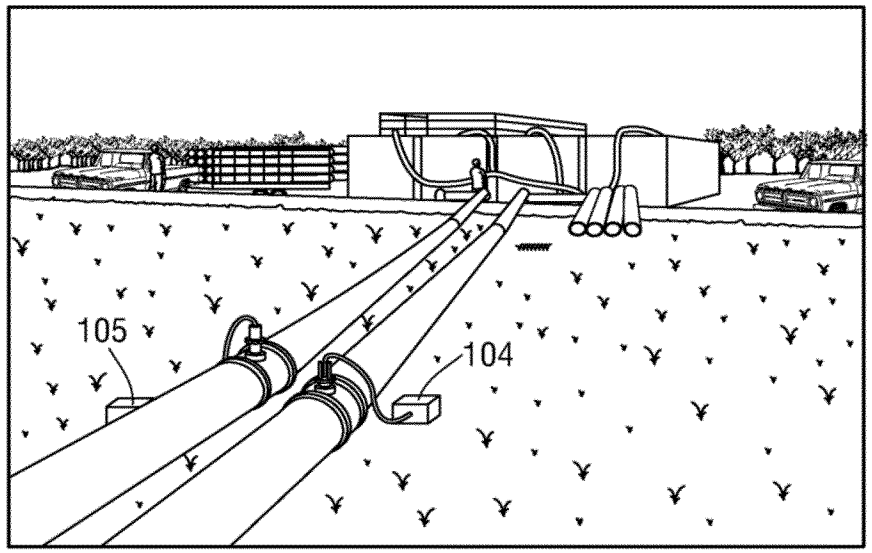
Figure 2:
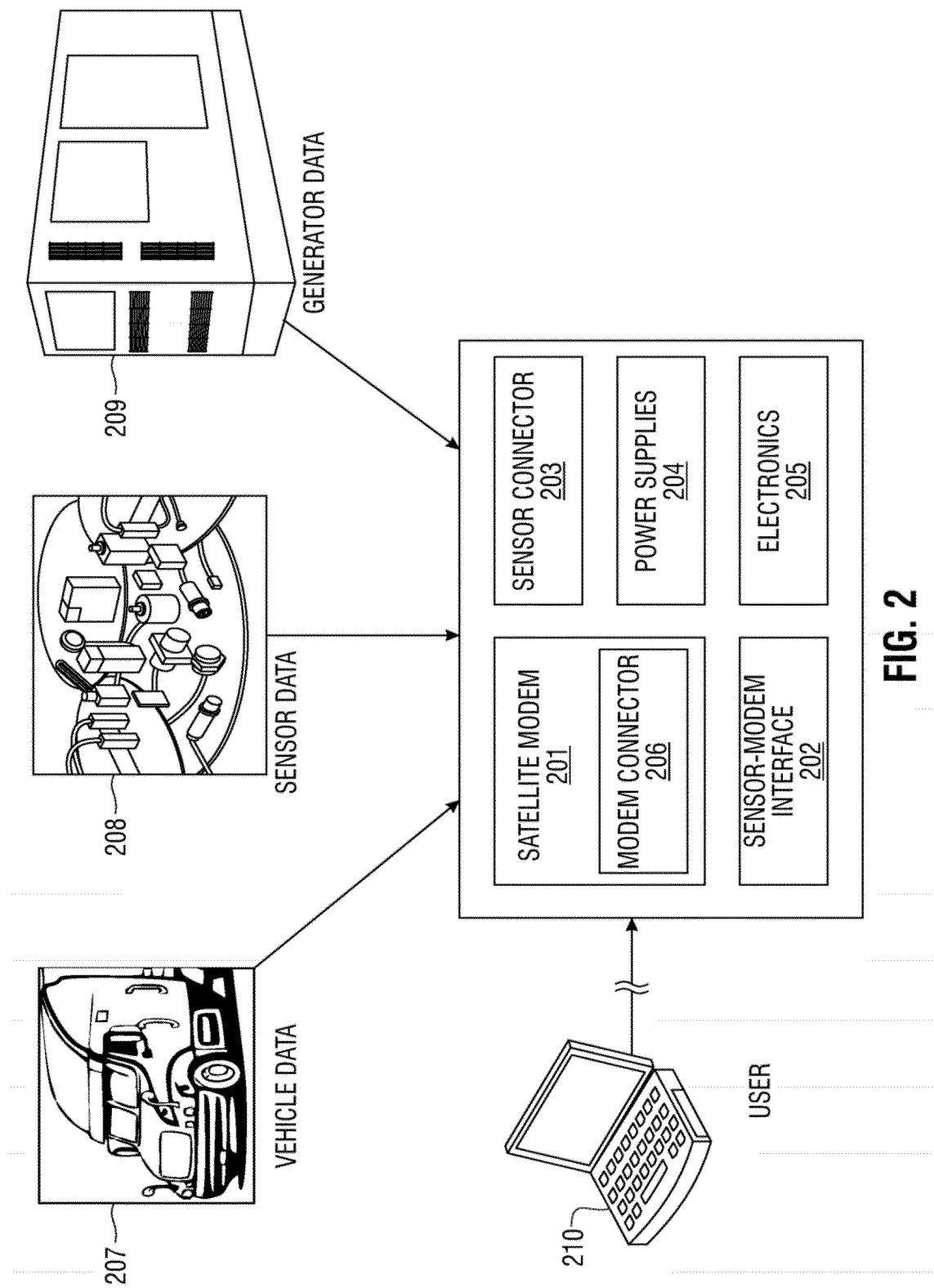
Figure 3:
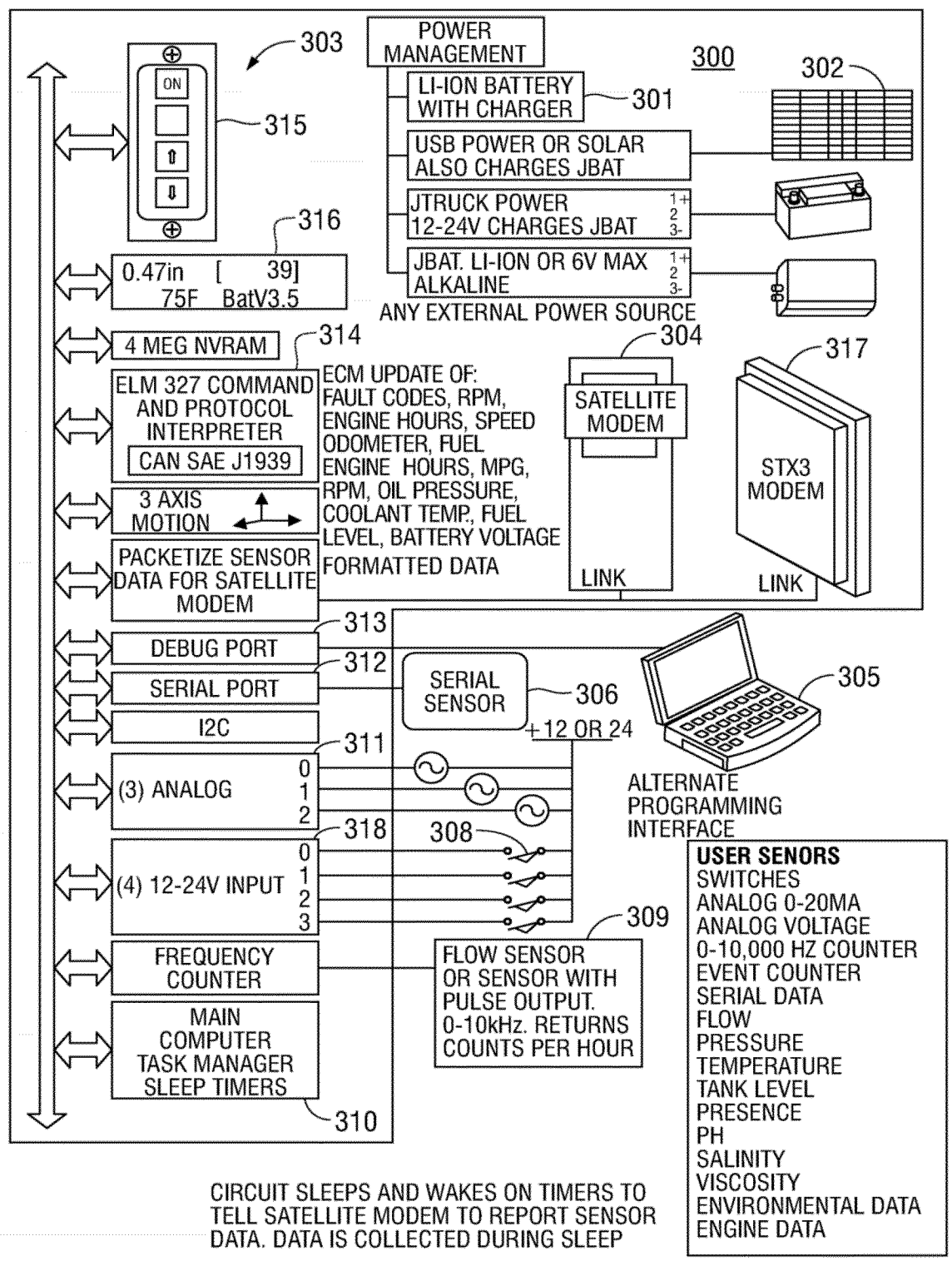
Figure 4:
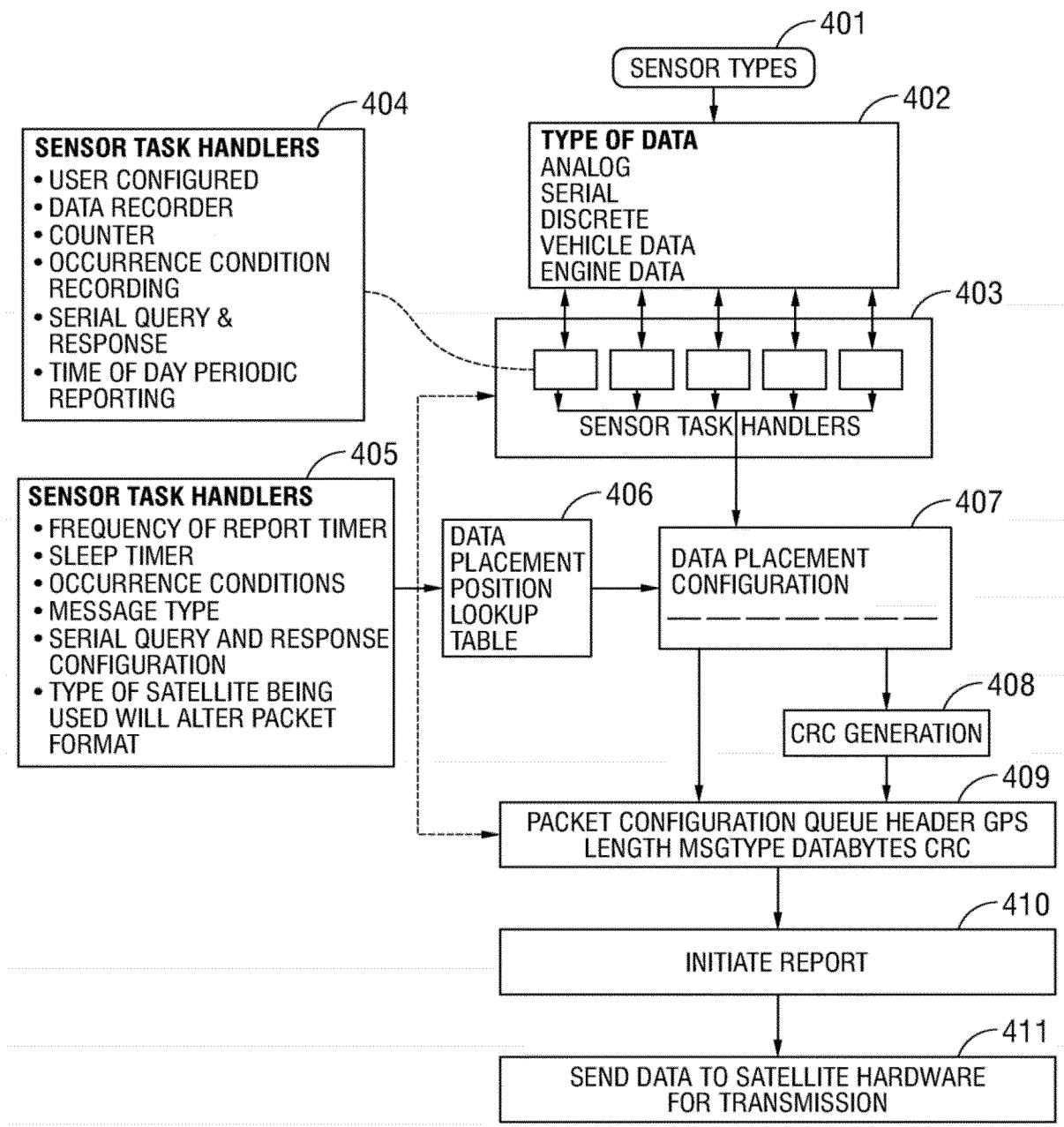
Figure 5:
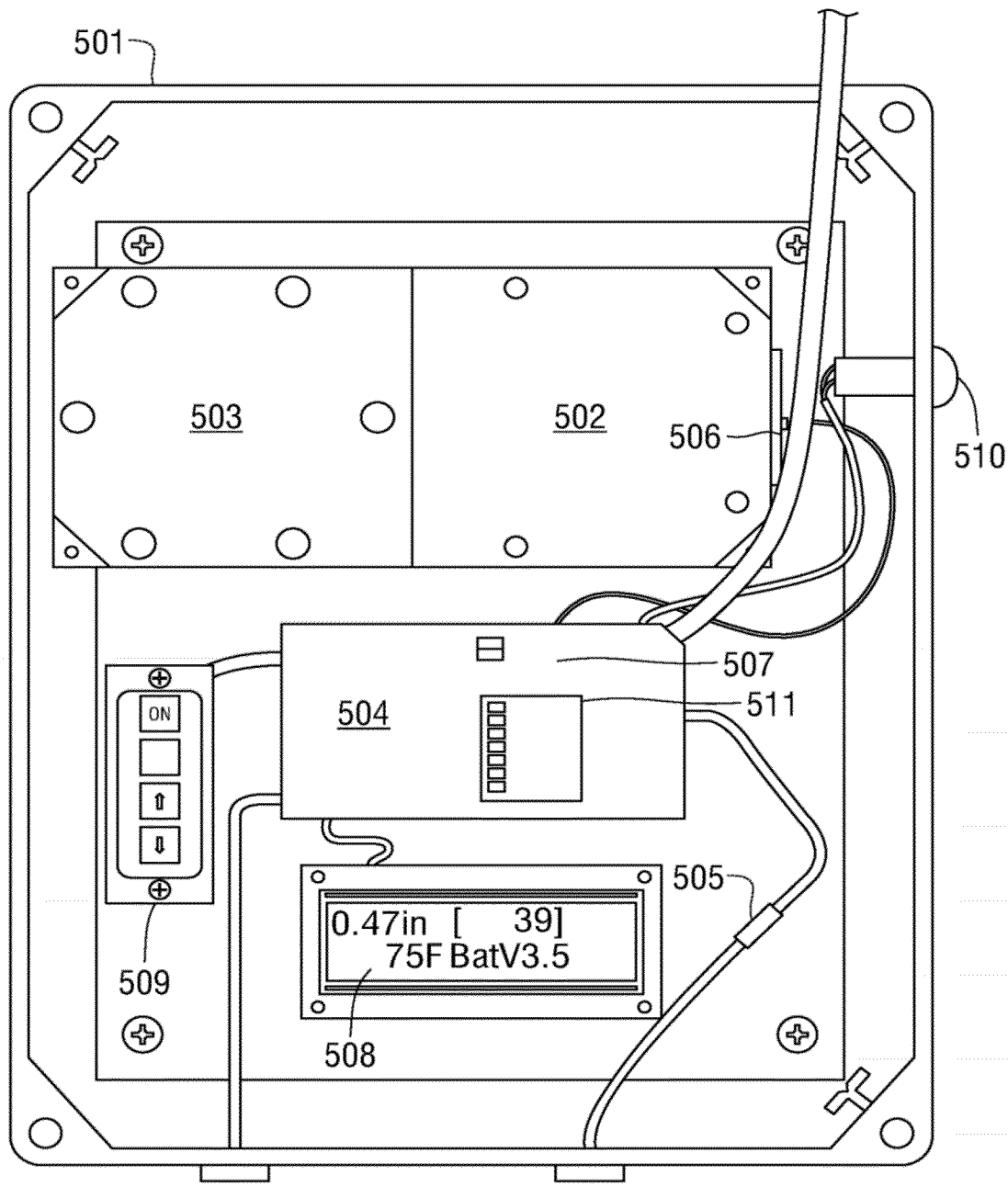
Figure 6A:
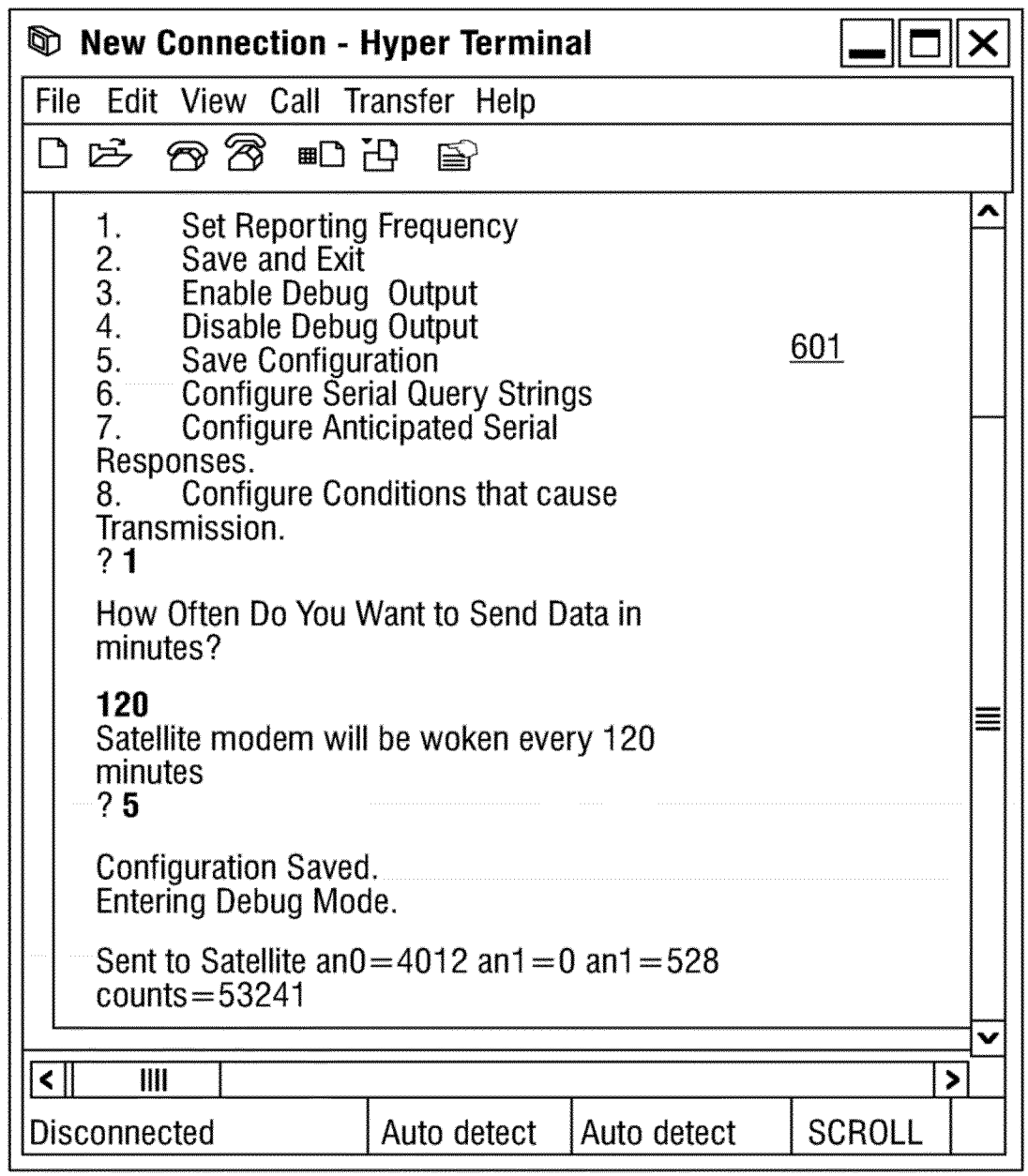
Figure 7:
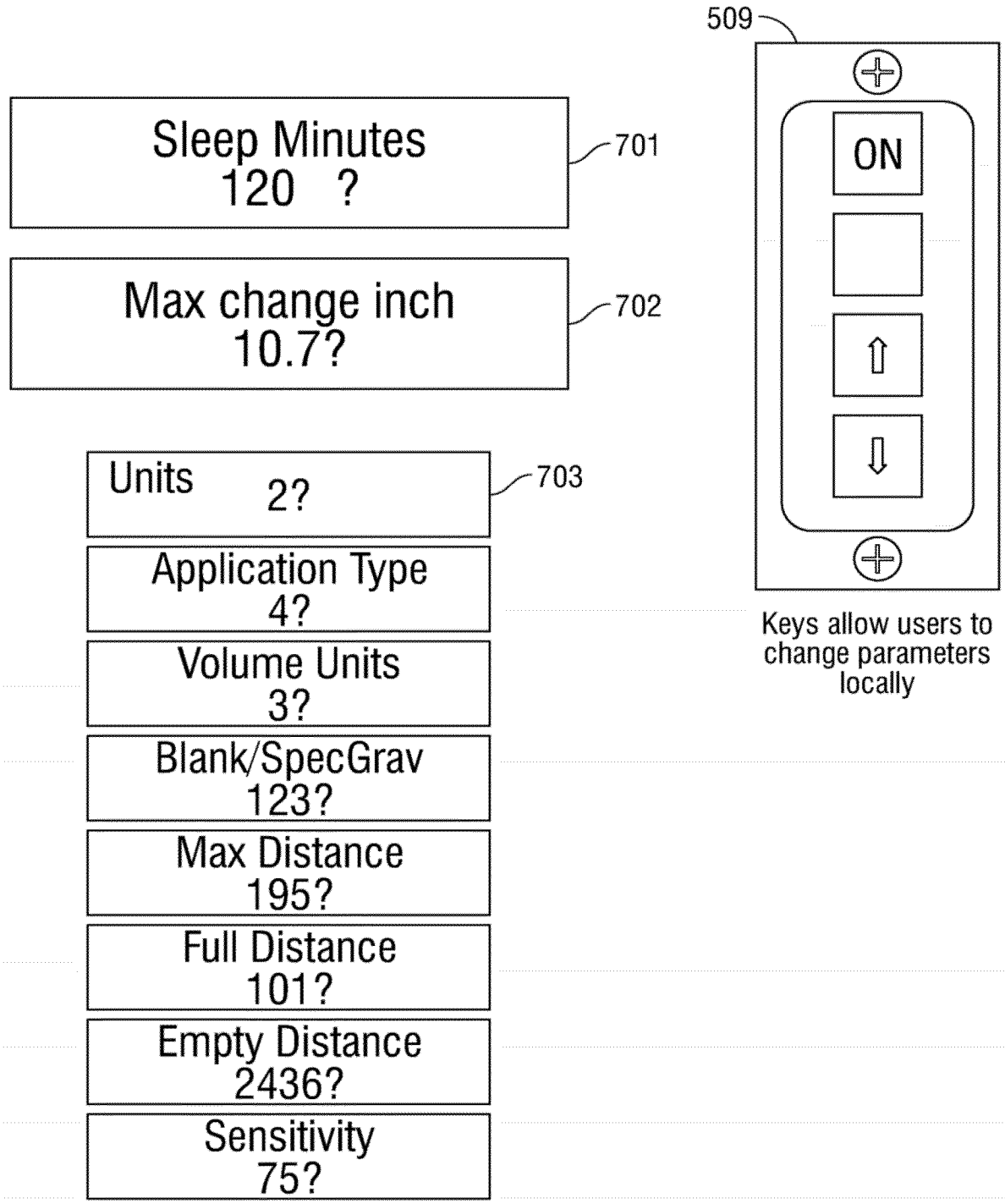

An example of the data that may be collected by a remote sensor unit and sent by a wireless communication adapter is shown generally at 102 in FIG. 1B. As may be seen, the data is remote water flow data, and it may be displayed in a variety of formats by the Web server. In the example shown here, the remote water flow data is tabulated in a spreadsheet format with a graph of the sensor performance.

Another example of the data that may be collected by a remote sensor unit and sent by a wireless communication adapter is shown generally at 103 in FIG. 1C. The data here is from a plurality of sensor inputs located throughout a remote water treatment facility and may include, for example, water heights, pump status, alarm conditions, and the like.

An example of a remote sensor unit equipped with a wireless communication adapter and being used in a real-world application is shown generally at 104 in FIG. 1D. The remote sensor unit 104 here is a flow sensor being used to track flow rates and the like on a gas fracturing job. A complimentary remote sensor unit is shown generally at 105 that feeds data to another wireless communication adapter at the gas fracturing job. The data from this sensor unit 105 may include instantaneous flow, fault conditions, total water pumped for the day, and the like.

The foregoing sensor units are each generally well known to those having ordinary skill in the art and may include different types of sensors collecting different types of data using different types of data format. In accordance with the disclosed embodiments, each of these sensor units may be fitted or otherwise provided with the same wireless communication adapter for transmitting their disparate data types back to the Web server. This is made possible and commercially feasible by the use of a sensor-modem interface unit within the wireless communication adapter disclosed herein to process the sensor data from the different sensor units. The sensor-modem interface unit is able to accept disparate data types from the different types of sensors, provide the data to the modem in an acceptable and appropriate data format, and thereby allow the modem to transmit the different types of data over the wireless network to the Web server for display to the user via their respective Web pages. The sensor-modem interface unit additionally allows the user to configure and specify, among other parameters, how often sensor data will be read and transmitted by the modem via their respective Web pages.

Following is a more detailed description of the wireless communication adapter disclosed herein. Although the wireless communication adapter is described with respect to a satellite network and a satellite modem, those having ordinary skill in the art will understand that the principles and teachings disclosed herein are equally applicable to other types of wired or wireless networks, including cellular networks, and the like.

Figure 2:
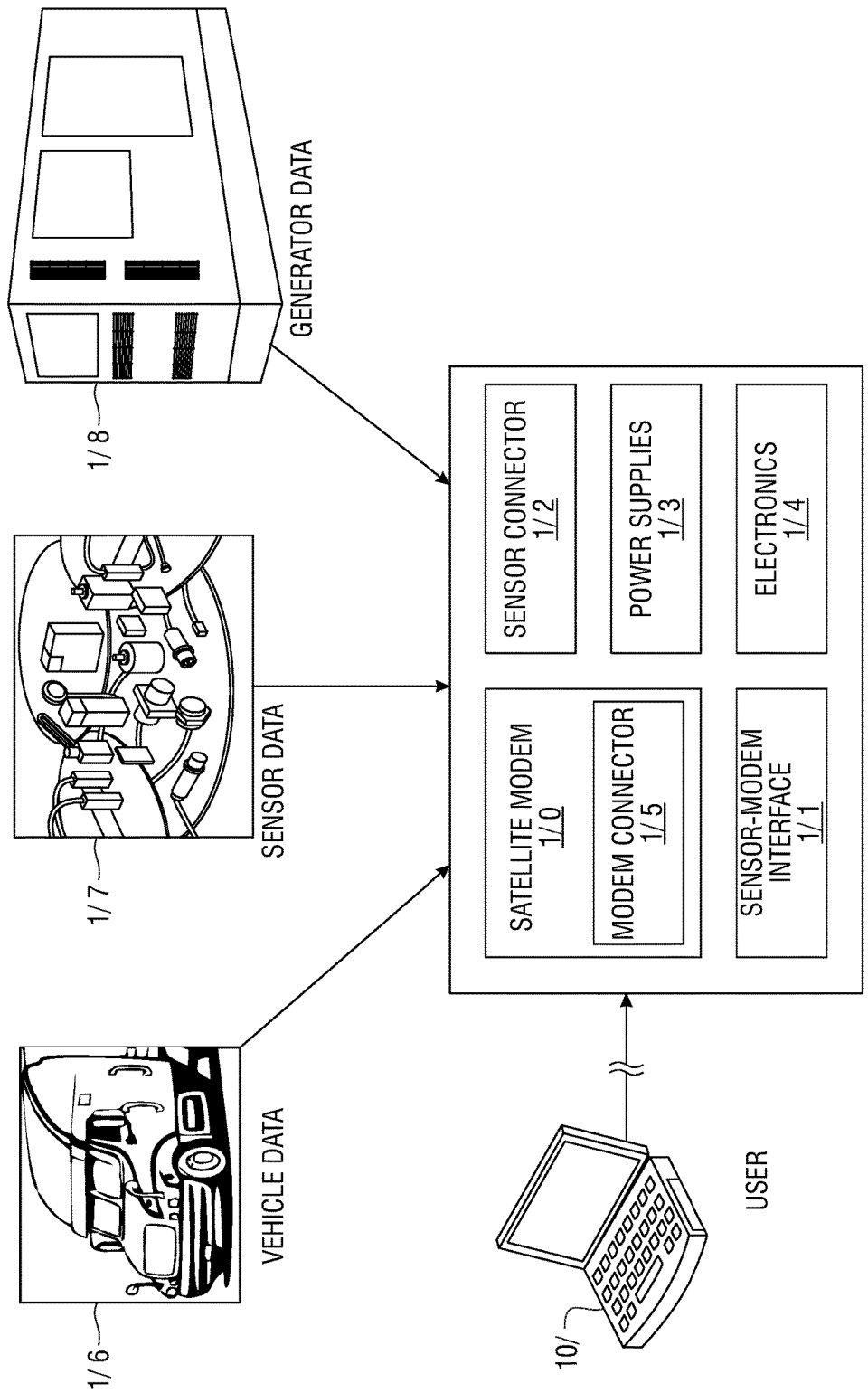
FIG. 2 illustrates an exemplary architecture for a remote sensor unit having a satellite communication interface according to the disclosed embodiments.

FIG. 2 illustrates an exemplary architecture for a wireless communication adapter 200 having a sensor-modem interface unit according to the disclosed embodiments. As may be seen, the wireless communication adapter 200 may include a number of functional components, including a satellite modem 201, such as those readily available from a variety of vendors, including GlobalStar, Inc. A sensor-modem interface unit 202 is provided that operates as an interface between the satellite modem 201 and any sensors connected to the wireless communication adapter 200. Such sensors may be connected to the wireless communication adapter 200 via an external sensor connector 203 that is configured to receive the sensors. A battery or other power supply 204 may be used to power any external sensors, particularly in remote regions, for extended periods of time. Additional battery packs or external power sources such as a solar panel or vehicle battery or local 120 V power, may also be used as needed. Any additional electronics or other components that may be needed for the wireless communication adapter 200 are indicated at 205.

In general operation, raw data from various types of sensors may be provided to the wireless communication adapter 200 via the sensor connector 203. This raw sensor data is received by the sensor-modem interface 202, which processes the data by packaging or repackaging the data in an acceptable data format for the satellite modem 201. The sensor-modem interface 202 then provides the reformatted data to the satellite modem 201 for transmission to a server over the satellite network. In some embodiments, the sensor-modem interface 202 operates by packetizing the sensor data for the satellite modem 201 according to the data format required by the satellite modem 201.

Some satellite modems 201 may have an external connector 206 that provides an interface, such as a serial or parallel interface, with external devices. This connection may in the form of a direct connection to the pins of a modular satellite modem circuit, such as the STX3 from GlobalStar. The sensor-modem interface unit 202 may communicate with the satellite modem 201 through this connector 206, for example, by toggling enable lines and sending the serial or parallel data to the satellite modem 201. The satellite modem 201 then sends acknowledgements to the sensor-modem interface 202. CRC checking may be done by the satellite modem 201 in some embodiments to ensure proper communication before anything is transmitted.

In some embodiments, the satellite modem 201 may add internal GPS data (typically from a built-in GPS) to the sensor data provided by the sensor-modem interface unit 202 before transmitting the data to the satellite network. The satellite network typically uses ground based antennas to receive the data, then puts it on the Internet and sends it to the appropriate servers for processing, analysis, and display. The servers format the data for the end users and typically presents the data to the end users in the format they wish to see.

In the embodiment of FIG. 2, data from a vehicle on-board computer, indicated at 207, may be provided to the wireless communication adapter 200. Similarly, data from a generator on-board computer, indicated at 209, may also be provided to the wireless communication adapter 200. The sensor-modem interface unit 202 in the wireless communication adapter 200 then processes the data from the on-board computers and translates it into a format appropriate for the satellite modem 201. In some embodiments, the satellite modem 201 itself may be preconfigured to receive certain vehicle or generator on-board computer data, such that no processing of the vehicle on-board computer data is needed by the sensor-modem interface 202.

In some embodiments, raw data from proximity sensors, encoders, limit switches, optical sensors, position sensors, and other sensors that measure physical characteristics, indicated generally at 208, may be provided to the wireless communication adapter 200. The sensor-modem interface unit 202 again retrieves the raw sensor data from the various sensors, processes the data and translates it into a data format appropriate for the satellite modem 201.

In some embodiments, logic or programming in the sensor-modem interface unit 202 determines whether the satellite modem 201 should be woken and data transmitted. Such programming may be determined by a user 210 using an appropriate programming interface. This allows the user 210 to configure, among other things, the timing and frequency of when the sensor data is to be sent. For example, data might be sent when a certain condition or event occurs, or at regular time intervals. As assets to be monitored are often in very remote regions, the wireless communication adapter 200 and sensors are typically battery powered so the electronics may be placed in a "slumber" mode while monitoring sensors. Should a predefined condition occur (e.g., time, level, temperature, pressure, etc.), appropriate portions of the circuit may be woken to be able to accomplish the satellite transmission.

Figure 3:
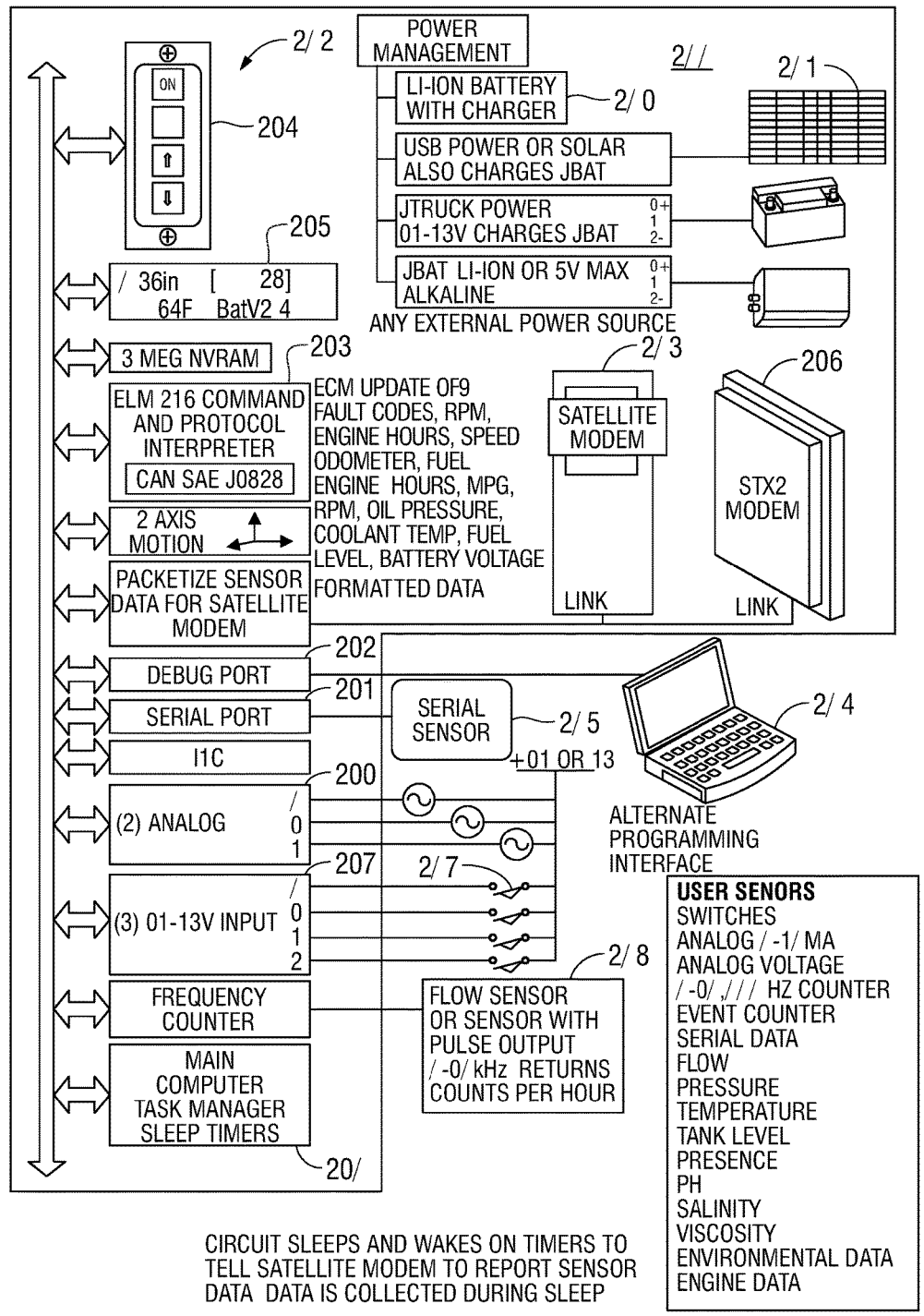
FIG. 3 illustrates an exemplary block diagram for the remote sensor unit having a satellite communication interface according to the disclosed embodiments.

Referring now to FIG. 3, the sensor-modem interface unit 202 of FIG. 2 is shown in more detail via a block diagram 300. As may be seen at 301, the sensor-modem interface unit can receive power from many different energy sources, including a battery. Internal power regulators, not expressly shown, may be provided to condition the power to the appropriate voltages. A solar panel 302 may be used for providing external power in environments where it does not snow. Vehicle or engine batteries are the most convenient to ensure long life power.

As indicated at 303, the sensor-modem interface unit can accept data from many types of sensors, including sensors that output analog signals, current, pulsed counter, events, or serial data may be interpreted. Sensors from many different suppliers may be used to measure physical attributes, such as pressure, temperature, tank levels, presence or absence of cargo, pH level, salinity, chlorides, viscosity, environmental data, generator data, solar panel data, and engine data.

A satellite modem 304 is provided to allow the sensor-modem interface unit to communicate over a satellite link.

The satellite modem 304 might be in the form of a separate external unit as shown here; alternatively, the satellite modem may be in the form of a modular satellite circuit 317 to facilitate internal connection. Communication and data packets between the internal or external satellite modem are virtually identical. Data provided over the serial or parallel link to the satellite modem 304 or 317 is carefully formatted so that it is acceptable and appropriate for the satellite modem being used. The data may be formatted differently depending upon the satellite modem being used.

The satellite modem 304 or 317 typically is in a low power sleep state and acts as a slave to the sensor-modem interface unit. The modem wakes when it receives any serial data from the sensor-modem interface unit. The satellite modem makes the satellite transmission, and then goes back to sleep until it is again woken for the next transmission. Typically, the satellite modem transmits the same data three times to increase the likelihood that the transmission was successful.

An external computer, generally indicated 305, may be used to allow the user or factory to configure operation of the sensor-modem interface unit. This computer 305 may be used to tell the sensor-modem interface unit the types of sensors that are being monitored, under what conditions the satellite modem should transmit the data, how the data will be formatted, and any conditions that should be monitored to trigger a satellite transmission.

Some sensors have more than a simple on-off type of signal or an analog signal. These sensors, generally indicated at 306, are typically serial in nature. The serial port might be Modbus, RS-232 or RS-485. It may send a regularly transmitted serial data packet, or the sensor-modem interface unit may need to query the sensor to report data. If the Modbus protocol is used, it may require that a request for one or more Modbus registers be returned. A Modbus sensor may have integral pressure, level, and temperature, with various registers representing the value of each physical attribute. Such Modbus, discrete, or serial sensors may all be interpreted and data prepared for satellite transmission. The sensor-modem interface unit allows the user, via a user configuration screen, to tell the sensor-modem interface unit how the serial port is to be monitored and interpreted. The sensor-modem interface unit may also be configured by the factory for certain sensor scenarios to minimize setup hassle by the user.

In some embodiments, various simple analog sensors may be present, as indicated generally at 307, that may be monitored. The user may configure which sensors are to be monitored via the user configuration screens (discussed with respect to FIGS. 6A-6C). The data monitored may be an analog voltage or an analog current signal, such as a 0-20 mA signal.

Sensors that have discrete on off signals may also be monitored, such as a level switch or door switch, indicated generally at 308. The user may configure whether these switch closures will cause the sensor-modem interface unit to initiate a satellite transmission.

A frequency counter or event counter that can count occurrences in a time window may also be monitored, indicated generally at 309. This counter may be user-configured and the frequency of the satellite transmission may be specified by the user. The counter is typically used with a flow meter or the like to count, for example, turbine blade rotations per minute, so instantaneous flow rate or total flow rate for a specified time period may be determined. Total counts since the time power was applied may also be tracked and transmitted to the user's Web page. Total counts are typically a long integer and may occur over many months. This may be used, for example, to give total gallons or barrels over a time span and is often easier to manipulate than adding individual reported flow rates. The total flow counts may be offset at specific time intervals such as midnight to give total flow of barrels in a day.

A main computer task manager/sleep timer may be present in the sensor-modem interface unit, indicated generally at 310. This component may be programmed to manage the entire process of monitoring the various sensors, when to slumber or sleep, and how to packetize the sensor data for eventual transmission to the satellite modem, as depicted in more detail in FIG. 4. Total counts since the time power was applied may also be tracked and transmitted to the user's Web page. Total counts are a long integer and may occur over many months. This may be used to give total gallons or barrels over a time span and is often easier to manipulate than adding individual reported flow rates. The total flow counts may be offset at specific time intervals such as midnight to give total flow of barrels in a day.

Analog ports, indicated generally at 311, may be provided for monitoring voltage or current readings, such as those provided by the analog sensors 307. Voltage readings typically vary from 0-3.3 V. The voltage level is typically converted into a number from 0-FFF hex (0-4095). This value is then placed into the satellite data string and transmitted. Industrial processes often use current sensors because current signals generally do not lose signal strength over longer distances like voltage signals sometimes do. Current can easily be converted to a voltage using an op-amp or simple resistor and read by the same analog port. Once the current is converted to a voltage, the voltage may be converted into an integer, for example from 0-4095, before it is placed into the packet of data ready to be sent to the satellite.

Serial ports, indicated generally at 312, may be provided for monitoring serial data, such as those provided by the serial sensors 306. In some embodiments, the serial ports 312 may be user-configured to request special packets of data from a smart external sensor, such as a level logger or hygrometer (not expressly shown). These smart sensors require that a request be sent to the water level sensor such as a "aV!" followed by "aD0!." This is an example of a typical cryptic serial command sent from the device to an external sensor such as a LevelLogger environmental ground water level sensor from Solinst Canada Ltd. of Georgetown, Ontario, Canada. In this case "aV!" means 'start verification' followed by "aD0!," which means 'send data.' After a brief pause, the LevelLogger sensor will respond with a value that is related to the water level. These serial query commands may be configured by the user or factory-configured and are often specific to the sensor being interrogated.

In addition, the serial ports 312 may also be used to transmit I2C (I squared C) data to discrete sensors. I2C is a 2-wire protocol for low speed peripherals and is ideal for communicating with multiple sensors on the same two wires. Another communication method that may be used involves 1-wire iButton products from Dallas Semiconductor that allow sensor data to be sent and retrieved over a single data connection. Popular applications are "key fob" personnel identification devices commonly used to control access, such as entry into munitions storage. An ID is retrieved from the fob, and door status, and possible abuse are all transmitted via satellite. The user or factory may configure the sensor-modem interface unit to be used in a specific application.

Other sensor ports may include 12-24 V inputs, indicated generally at 318, for receiving and monitoring the discrete on off signals from the discrete sensors 308, such as a level switch, door switch, and the like.

A debug port 313 may be provided that may be used by the user or developer to configure the sensor-modem interface unit for monitoring communication messages during the development and implementation of the unit.

A command and protocol interpreter 314 may be provided that allows the sensor-modem interface unit to read engine data from either OBD2 (smaller vehicle trucks and cars) or J1939 (larger semi tractors and heavy equipment such as generators). The command and protocol interpreter 314 transmits a Parameter Group Number and Suspect Parameter Number to the vehicle requesting that a specific piece of information be returned. When the vehicle computer receives the request for data, it quickly returns the data of interest such as speed, odometer reading, fuel level, transmission temperature or virtually any piece of data from the vehicles or generators various computers. Once the sensor-modem interface unit receives the data from the vehicle or generator, the data is placed in the satellite packet of data, sent to the satellite modem and transmitted. A message state indicator in the satellite data packet differentiates between engine data in the satellite packets and other types of data.

A keypad 315 may be present to allow the user to locally scroll through and change sensor setup values, sleep times, wake alert conditions or other operational parameters. A display 316 may be provided to give the user a local display of the physical attributes being read by the sensors as well as visual feedback when operational parameters are being changed via the keypad 315.

As well, voltage inputs 316 may be provided for monitoring the discrete on off signals 308. In some embodiments, the voltage inputs 316 may have an input range between 12-24 V.

Figure 4:
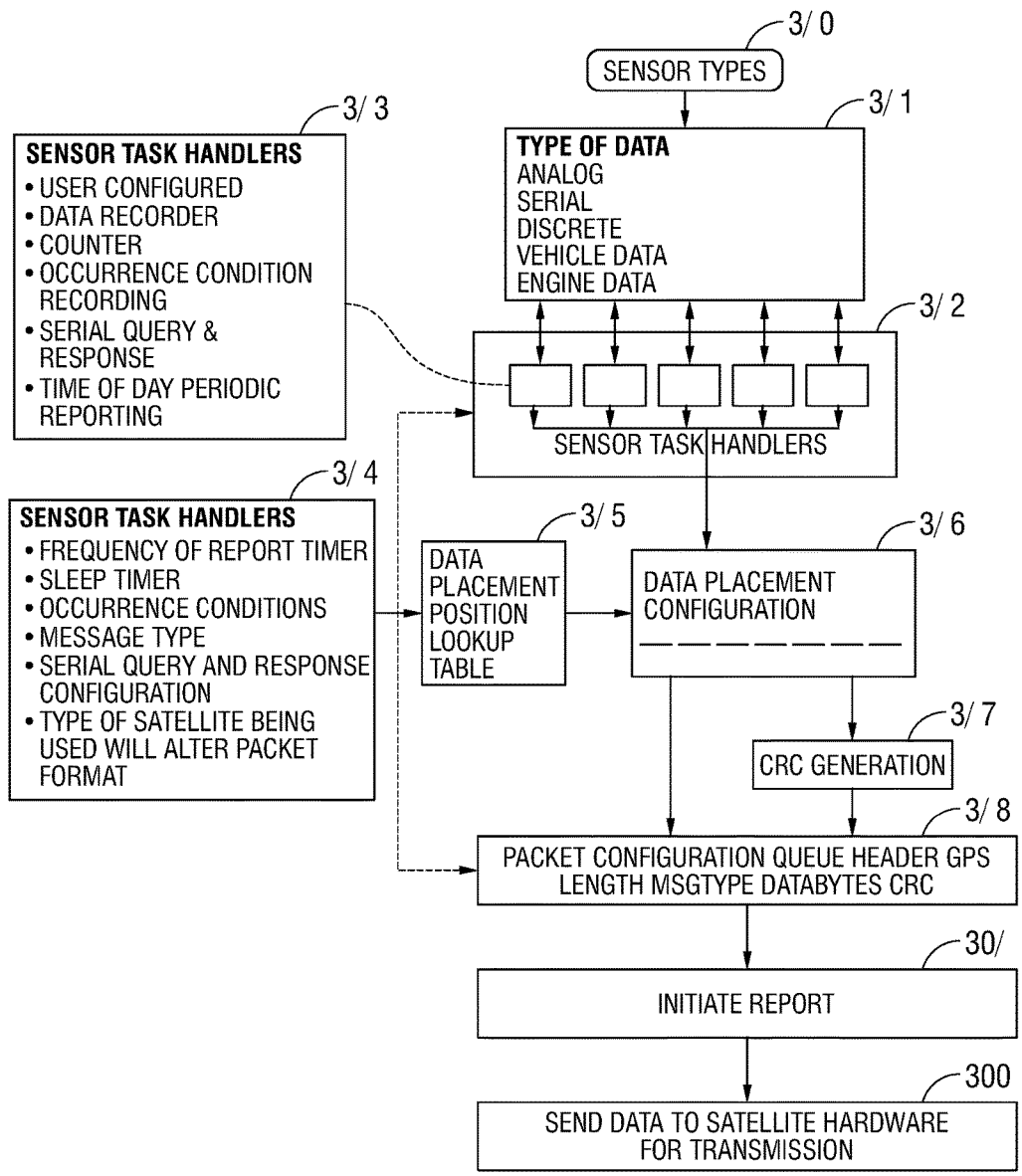
FIG. 4 illustrates a flow chart showing an exemplary software structure for the satellite communication interface according to the disclosed embodiments.

In some embodiments, the sensor-modem interface unit may be implemented using a processor. Such a processor may be, for example, a MSP430FG4619IPZR mixed-signal microcontroller from Texas Instruments, Inc. or Dallas, Tex. FIG. 4 illustrates a flow chart showing an exemplary software structure that may be used with a processor-based implementation of the sensor-modem interface unit according to the disclosed embodiments.

As can be seen at 401, many sensor types may be handled by the sensor-modem interface unit. Example of the types of data, generally indicated at 402, may include analog, serial, discrete, generator, and vehicle data, engine data, and the like. The sensors feed the sensor data to various electrical interfaces depending upon the sensor type, as generally indicated at 403. These electrical interfaces may be monitored by interrupt handlers or "task handlers" in the processor that have been configured by the user to act appropriately to satisfy the user's monitoring requirements.

In general, several different task handlers are launched when the sensor-modem interface unit starts up. Task handlers are configured to wake the satellite modem when various conditions occur such as: a serial character or serial pattern is retrieved, when an input changes state to a high or low condition, when an analog value changes more than a specified amount or when a timer expires, and the like. Any of these may be an alarm or undesired condition that then triggers the task handler to wake the satellite modem. Typically, the task handler will simply monitor the data during low power operation and only waken after a specified interval or time of day. Several task handlers may be run using interrupts in the processor and they may appear to be running simultaneously, but they are actually running efficiently with different priorities and are simply using time slicing to get their tasks accomplished. When a desired condition occurs, the task occurrence brings the processor fully awake. The processor then initiates the sequence to send a message to the satellite. The task manager is the operating system architecture that turns tasks on and off to enable and disable different types of monitoring for different sensors.

Examples of individual sensor task handlers are indicated generally at 404, some of which may be configured by the user or the factory. A task handler might send sensor data based upon a specified time period or when an event occurs, such as when a switch trips. The ability to individually configure how sensor data will be handled, where it will be placed in the satellite data packet, how sensor data is queried and received and what type of data will be recorded makes the sensor-modem interface unit unique.

In accordance with the disclosed embodiments, the user or factory may configure how the sensor-modem interface unit will operate using the external computer and interface menus, generally indicated at 405. This configuration might also be hard coded by the factory. The frequency of satellite transmissions, sensor conditions that might cause a satellite response, and how data is to be handled, may be configured by the user via suitable menu options. In addition, the user may specify what type of satellite is being used so that the sensor data may be appropriately packaged.

Based on the type of data the user wants to monitor and the sensor data being transmitted, a lookup table may be used in some embodiments to determine the position in the satellite data packet where each individual piece of sensor data from the task handlers is to be placed in the satellite data packet, as generally indicated at 406.

The data strings from the task handlers are then formatted according to the predefined data placement configuration from the lookup table, as indicated generally at 407. Such a data placement configuration allows the sensor-modem interface unit to format data from different sensors using the same data format.

A Cycle Redundant Check code (CRC) may be generated, as generally indicated at 408, using an appropriate CRC algorithm on the entire data packet. This CRC code may then be placed at the end of the serial data and transmitted at the end of the data packet. The satellite modem will reject the data as invalid or corrupt if the CRC code does not match what it determines the code should be based upon the data it just received. A re-transmission by the sensor-modem interface unit will be needed if the satellite modem rejects the data.

A packet configuration queue specifies the ordering of the final data string that is assembled, indicated generally at 409, prior to sending the data string to the satellite modem. For example, the packet configuration queue may specify that the packet includes a message header, message type, sensor data, and the CRC code.

Once the entire packet of sensor data is composed, reporting of the sensor data is initiated at 410, at which time the GPS data from the satellite modem may be added to the data string and sent to the satellite transmission hardware of the satellite modem.

Thereafter, the satellite modem transmits the entire data string to the satellite network, as generally indicated at 411. The satellites in the satellite network then send the data to ground based antennas and this data is thereafter routed over the Internet. Eventually, the data is received by Web based servers where it is re-configured into report formats appropriate for the user's specific requirements.

Figure 5:
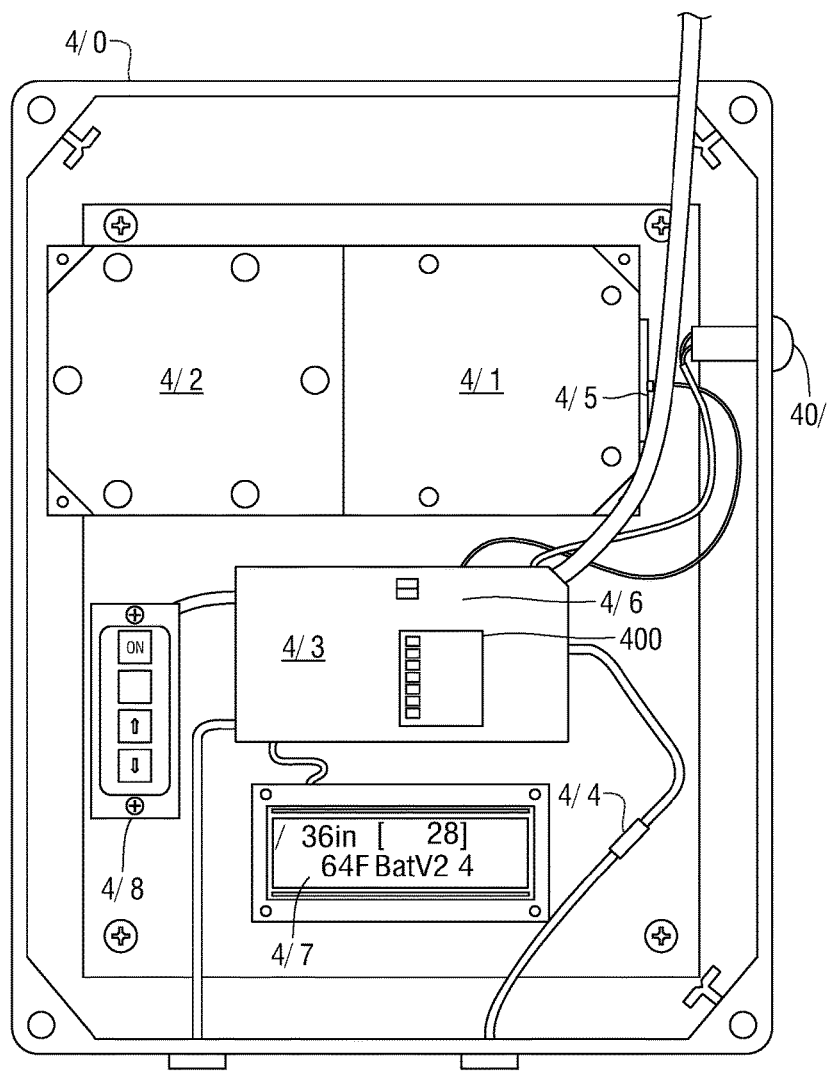
FIG. 5 illustrates the components for an exemplary implementation of the satellite communication interface according to the disclosed embodiments.

An actual, real-world implementation of a wireless communication adapter according to the embodiments disclosed herein is shown in FIG. 5. As may be seen, the wireless communication adapter comprises a robust, rigid, and waterproof enclosure 501 in which a satellite modem under cover 502, batteries under cover 503, the sensor-modem interface unit 504 disclosed herein, and any support brackets may be enclosed. As explained above, the sensor-modem interface unit 504 provides the data interface between the external sensors and the satellite modem 502 to accomplish the interpretation/translation of the various sensor inputs, and also triggers transmission of the data as well as handling power management.

One or more connectors, indicated at 505, may be used to connect the sensor-modem interface unit 504 to the external sensors, such as environmental, pressure, flow, temperature or vehicle sensors. To reduce cost, not all permutations and variations of connectors 505 need to be mounted on the enclosure 501, but those having ordinary skill in the art will understand that the sensor-modem interface unit 504 has the ability to accept many types of sensors.

An external connector 506 of the satellite modem 502 that may be used to provide a data link to the sensor-modem interface unit 504. This external connector 506 enables the handshakes and data communications needed for the sensor-modem interface unit 504 to communicate with the satellite modem 502. Satellite modem 502 may be entirely contained within enclosure 504 if a modular satellite modem such as the STX3 from GlobalStar is used instead of an external satellite modem. A plurality of header pins 507 inside of the enclosure 504 are provided on the circuit board of the sensor-modem interface unit 504, each header pin being designed to handle a different type of sensor output. These electrical pins 507 feed into the microprocessor of the sensor-modem interface unit 504 that runs the software and user-configured task handlers that determine when and how data is to be transmitted to the satellite network. A graphical display 508 and keypad 509 may be used to locally change parameters and to view data in real time. A wake-early button 510 allows the user to walk up to the device and wake it or command a local reading of the sensor or report sent to the satellite. In this example, the display 508 shows the current sensor values. After the wake-early button is pressed. LEDs 511 give a quick visual indication of proper operation of sensor reading and communication with the satellite modem.

Figure 6A:
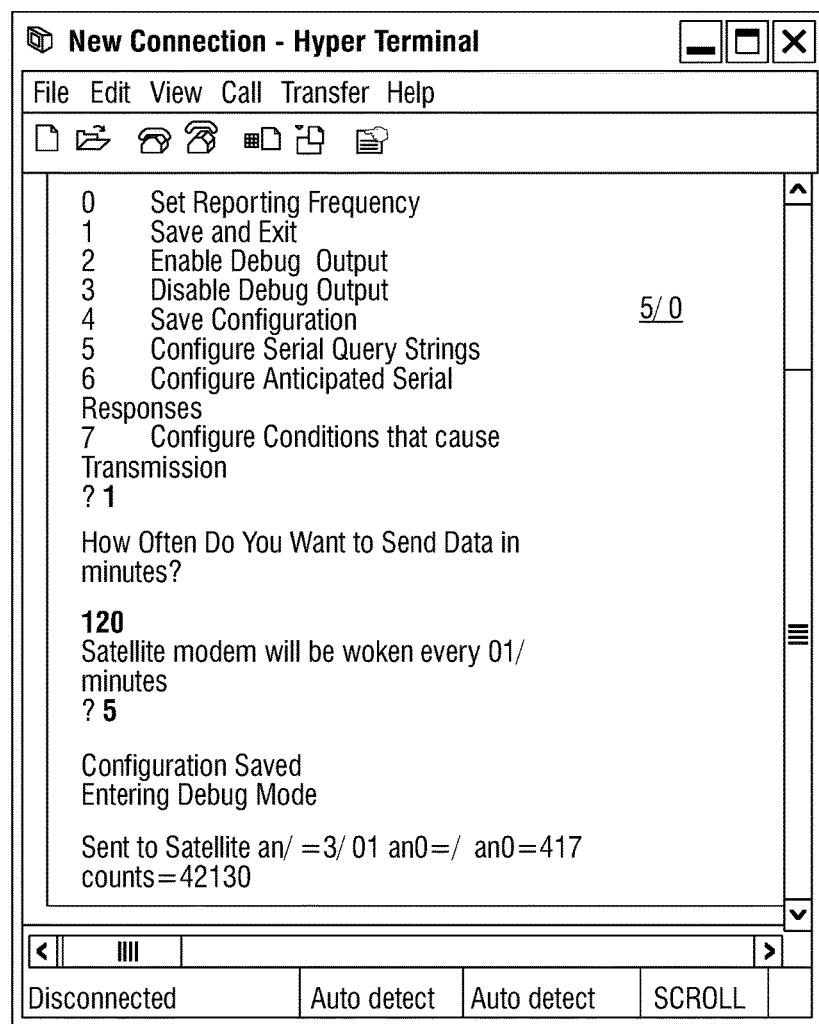

As mentioned earlier, the satellite modem used may be any suitable, commercially available satellite modem known to those having ordinary skill in the art. The particular satellite modem used is not important to the practice of the invention so long as the sensor data is translated into the appropriate data format for that modem. In one embodiment, the satellite modem may be the Smart One satellite modem from GlobalStar, Inc., the data format and configuration interface for which are illustrated in FIGS. 6A-6C. The modem might be a separate, external modem such as the Smart One satellite modem, or it might be an integrated circuit module such as the GlobalStar STX3. Data communication may be simplex where data communication only occurs from the remote device to a server, or it may be duplex where data communication is bi-directional between the device and the server.

As shown in FIG. 6A, an exemplary user interface 601 may be used by the user to program the sensor-modem interface unit. The local display and keypad may also be used for configuration, as explained later herein. The user interface 601 may be the well-known Hyper Terminal interface, or any other suitable serial communication tool may be used to program the sensor-modem interface unit and observe debug strings during development. But as the Hyper Terminal interface is built-in, no specific configuration tools need to be loaded. As can be seen, user enters simple commands to configure what sensor ports are to be monitored, sensor query strings, what events will trigger a transmission, send sensor recordings to RAM, update frequency, and the like. In addition to allowing the user to configure the type of data that will be transmitted, the user interface may also be used as a debugging monitor to see the raw satellite data, actual sensor data values and timing information as it is being sent to the satellite modem. Responses from the modem can also be seen to confirm that the transmission is successful.

FIG. 6B shows an example of an XML data file 602 that may be transmitted by the satellite modem to the satellite network, and then to the ground based antennas, routing computers, and eventually the Web servers. The Web servers parse this file 602 to extract pertinent data or payload and the payload information.

FIG. 6C shows an example of a data format 603 of the payload or data received by the Web server that is parsed from the XML file 602 sent by the satellite modem. As may be seen, the payload may include a message type indicator "msg" that may be used to identify the type of sensor data being sent. The message type may be determined by referring back to the lookup table that was used to specify where in the satellite modem data string the sensor data was placed based upon the user's configuration of how the sensor-modem interface unit is used. The lookup table may be achieved by using "IF" statements, an XML file, or multi-dimensional array. It is a table because the data is in a specified defined format depending upon the "msg" which identifies the expected format. For example, an IF(msg==ConditionConstant) statement followed by string format statement carefully places the data in the correct format before it is sent to the satellite modem. A message type "msg" of 1 may mean that the included data represents counts, discrete input, analog0, analog1, and so forth. A message type "msg" of 2 may mean that the data in the satellite data is representative of engine data, such as odometer reading, fuel level, speed, fault codes. A message type "msg" of 3 may mean that the attached data comes from a well water level logger that was retrieved via a serial port from a sensor about 100 feet below ground over an SDI-12 serial port. A message type "msg" of 4 me mean that the data consists of tank level for a frac tank in barrels along with the temperature of the water.

Figure 7:
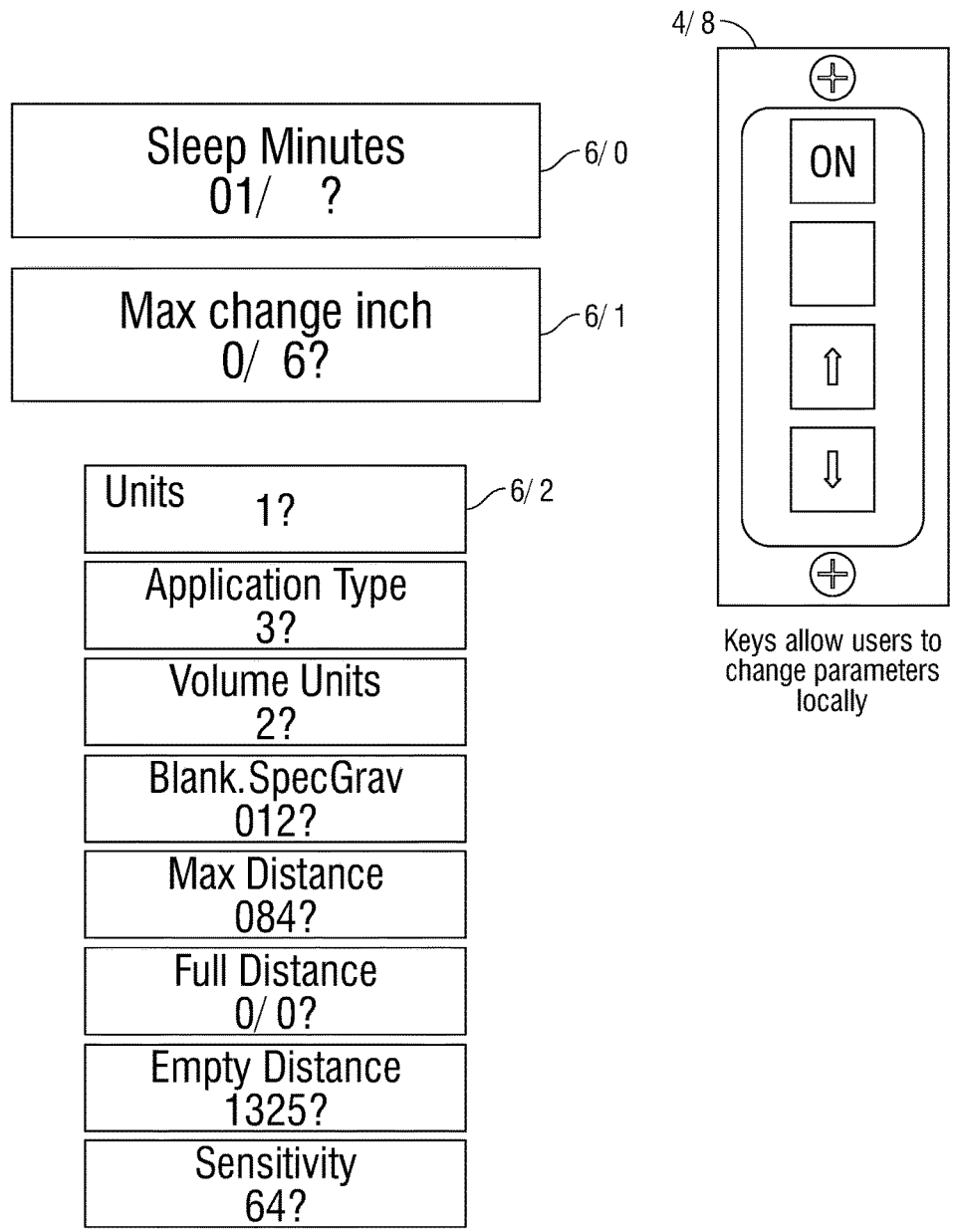
FIG. 7 illustrates an exemplary implementation of locally configuring the satellite communication interface according to the disclosed embodiments.

In addition to the Hyper Terminal interface, the GlobalStar satellite modems also allow the user to configure the modems using the local display 508 and keypad 509. This is depicted in FIG. 7, where the user may press the appropriate buttons on the keypad 509 to achieve configuration of the modem via the display 508, exemplary displays for which are reproduced at 701, 702, and 703. The display at 701 shows an example of local changing of the sleep time between readings. The display at 702 shows an example of changing the maximum allowed changes in level that will cause an alarm condition. Technologies such as Modbus may be used to allow the user to externally configure the sensor operation, as displayed at 703. Here, serial data is sent to and from the external sensor to configure Modbus registers to allow various units, type of application the sensor will be used for, displayed units, critical measurement distances, sensor sensitivity and other configuration attributes needed for proper sensor operation. Likewise, PGN codes that are to be read from engines over a J1939 of an OBD2 interface may be configured using the keypad and local display. The keypad may be used to scroll through possible parameters that may be read such as fuel level, engine hours, battery voltage, oil pressure, odometer and the user is given the opportunity to select if they wish for that data to be read. Also, fault codes from the engine may be enabled and reported over the serial interface.

In some embodiments, the data or payload may be compressed by the sensor-modem interface unit to minimize satellite air time cost and sometimes contains latitude, longitude, and sensor data. GPS may be sent with the data message. Data and GPS may also be sent as separate types of messages with the message type defining the type. And as discussed herein, the sensor-modem interface unit may also instruct the satellite modem when to transmit the data. The Web server may then interpret the message type in the usual manner to understand how each byte of data is to be construed or used by the server.

In one example, the message type "msg" is 54, which indicates that the data string has three input signals, three analog ports, and three counts per hour. Another message type "msg" of 44 would indicate that the data string contains odometer, engine RPM, fuel level, and speed. In yet another example, a message type "msg" of 72 would indicate that the data in the string comes from serial sensors for ground water quality, temperature, and other environmental conditions in a remote installation in Northern Canada. The message type allows the server to interpret many pre-defined data strings with a common hardware solution rather than trying to fit all permutations of sensors into one common data string.

In addition, in the file format 603, "hdr" represents a variable that has embedded therein the status of the battery inside the satellite modem, whether there are any GPS reading faults or other faults, an indication that the bytes that follow will contain GPS position with the data, or whether the message only contains GPS data. "Inputs" indicates the status of the discrete input signals and is a number represented by: input1+input2<<1+input3<<2+input4<<3. "AnalogX" are the various analog signals and might be voltage or current based, while "CntPerHr" is the number of events or counts that have occurred if the sensor has a counter type output. "Total Counts" is the number of counts since the unit was turned on. This may be very helpful for keeping track of the total amount of fluid through a pipe, for example, for the last day, week, or month. The Web site may also run a SQL call and null out recent reports of this total counter to show flow for the day or any arbitrary time span. This eliminates potential or confusion in trying to add up flow from multiple reports.

While the invention has been described with reference to one or more particular embodiments, those skilled in the art will recognize that many changes may be made thereto without departing from the spirit and scope of the description. Each of these embodiments and obvious variations thereof is contemplated as falling within the spirit and scope of the claimed invention, which is set forth in the following claims.

What is claimed is:

1. An electrical circuit designed to process multiple different user-selectable sensor inputs, including discrete, serial, and analog inputs, the electrical circuit comprising a processor having a sensor task handler configured to interpret data from one of the sensor inputs, the data from the sensor input being in a raw data format that is incompatible with a satellite modem data transmission format, and conform the data from the sensor input to a predefined format, the predefined format allowing the data from the sensor input to be transmitted by a satellite modem, the sensor task handler further configured to:
    enter into a low power mode;
    monitor the sensor inputs while in the low power mode;
    wake from the low power mode based on a condition for satellite transmission; and
    enable different types of monitoring for different sensor inputs;
    wherein conforming the data includes packetizing the data for transmission by the satellite modem according to a predefined data placement within the predefined format.

2. The electrical circuit of claim 1, wherein the processor has multiple isolated sensor task handlers, each isolated task handler individually configured to interpret data from a different one of the sensor inputs substantially simultaneously.

3. The electrical circuit of claim 1, wherein the condition for satellite transmission is one of the following: a timer based condition, a time of day condition, a predefined low or high sensor value condition, a predefined low or high flow rate condition, a predefined low or high pressure condition, an alert condition from the sensor itself, or specific data pattern.

4. The electrical circuit of claim 1, wherein each sensor task handler is configured by a user or factory using an external computer, each sensor task handler being configurable with respect to individual serial ports, type of serial port, baud rate, query commands to the external sensor, anticipated serial responses, and frequency of reporting.

5. The electrical circuit of claim 1, wherein the data from each sensor input is conformed to the predefined format by placing the data in one of several predefined locations of a data packet, the predefined locations being different depending upon the type of data desired by the end user.

6. The electrical circuit of claim 5, wherein the predefined format includes a message type indicator that tells a central server which one of a plurality of predefined patterns the data from the satellite is associated with so that the data packet may be parsed and linked to a specific type of sensor, thereby allowing the data to be properly scaled and presented to the user on a Web page.

7. The electrical circuit of claim 5, wherein the predefined format includes a total counts indicator that may be used to determine a running total of an occurrence for an arbitrary time span, the total counts indicator being taken at a predefined time and used to offset the following day's readings.

8. The electrical circuit of claim 1, wherein the electrical circuit is configured to allow a user to view current sensor values and monitor debug messages, including debug messages related to a condition that initiated a transmission to the satellite modem, the debug messages also including sensor data and raw data transmitted to the satellite modem and responses from the satellite modem.

9. The electrical circuit of claim 1, wherein the electrical circuit is configured to allow a user to locally change one or more predefined parameters by using pushbuttons and a local display, the one or more predefined parameters including alert thresholds, sleep timers, sensor configuration, and engine data.

10. The electrical circuit of claim 9, wherein the electrical circuit is configured to allow a user locally to view the various sensor or engine data results.

11. A method of monitoring multiple different user-selectable sensor inputs, including discrete, serial, and analog inputs, the method comprising configuring a plurality of sensor task handlers of a processor to interpret data from the sensor inputs, the data from the sensor input being in a raw data format that is incompatible with a satellite modem data transmission format, and conform the data from the sensor inputs to a predefined format, each sensor task handler individually configured to interpret data from a different one of the sensor inputs, the predefined format allowing the data from the different sensor inputs to be transmitted by a satellite modem, the predefined format including a message identifier for each sensor input that allows a central server to determine which of several predefined sensor data formats the transmitted data is in, each sensor task handler further configured to:
- enter a low power mode;
- monitor the sensor inputs while in the low power mode;
- wake from the low power mode based on a condition for satellite transmission; and
- enable different types of monitoring for different sensor inputs;
- wherein conforming the data includes packetizing the data for transmission by the satellite modem according to a predefined data placement within the predefined format.

12. The method of claim 11, wherein each sensor task handler is configured to interpret data from one of the sensor inputs substantially simultaneously with other sensor task handlers.

13. The method of claim 11, wherein the condition for satellite transmission is one of the following: a timer based condition, a time of day condition, a predefined low or high sensor value condition, a predefined low or high flow rate condition, a predefined low or high pressure condition, an alert condition from the sensor itself, or specific data pattern.

14. The method of claim 11, further comprising allowing a user to configure the sensor task handlers using an external computer, each sensor task handler being configurable with respect to individual serial ports, type of serial port, baud rate, query commands to the external sensor, anticipated serial responses, and frequency of reporting.

15. The method of claim 11, wherein the data from each sensor input is conformed to the predefined format by placing the data in one of several predefined locations of a data packet, the predefined locations being different depending upon the type of data desired by the end user.

16. The method of claim 11, further comprising allowing a user to view current sensor values and monitor debug messages, including debug messages related to a condition that initiated a transmission to the satellite modem, the debug messages also including sensor data and raw data transmitted to the satellite modem and responses from the satellite modem.

17. The method of claim 11, further comprising allowing a user to locally change one or more predefined parameters by using pushbuttons and a local display, the one or more predefined parameters including alert thresholds, sleep timers, sensor configuration, and engine data.

18. A wireless adapter designed to remotely monitor multiple different user-selectable sensor inputs, including discrete, serial, and analog inputs, the wireless adapter comprising:
- a satellite modem configured to communicate with a satellite network using a predefined message format;
- a sensor-modem interface unit connected to the satellite modem, the sensor-modem interface unit having a processor therein, the processor including a plurality of sensor task handlers configured to interpret data from the sensor inputs, the data from the sensor inputs being in a raw data format that is incompatible with a satellite modem data transmission format, and conform the data from the sensor inputs to the predefined message format, each sensor task handler individually configured to interpret data from a different one of the sensor inputs, the predefined message format allowing the data from the different sensor inputs to be transmitted by the satellite modem to the satellite network, the predefined format including a message identifier for each sensor input that allows a central server to determine which of several predefined sensor data formats the transmitted data is in; and
- a power supply configured to provide power to the satellite modem and the sensor-modem interface unit;
- wherein the sensor task handler is further configured to enter into a low power mode, monitor the sensor inputs during the low power mode, wake from the low power mode based on a condition for satellite transmission, and enable different types of monitoring for different sensor inputs; and
- wherein conforming the data includes packetizing the data for transmission by the satellite modem according to a predefined data placement within the predefined format.

* * * * *

UNITED STATES PATENT AND TRADEMARK OFFICE
CERTIFICATE OF CORRECTION

PATENT NO. : 10,290,203 B2
APPLICATION NO. : 14/031167
DATED : May 14, 2019
INVENTOR(S) : Peter E. McCormick It is certified that error appears in the above-identified patent and that said Letters Patent is hereby corrected as shown below:

In the Drawings

Sheets 1-9 are replaced with the following sheets 1-9.

Signed and Sealed this
Thirtieth Day of July, 2019

Andrei Iancu
*Director of the United States Patent and Trademark Office*

Interface unit acts as the master over the satellite modem.
You program how many hours elapse between reporting intervals. Example Payload XML.

Interface unit uses truncated Message type 0x26 to satellite modem which includes GPS location and user data. Payload length is 27 bytes.

```
<?xml version="1.0" encoding="UTF-8"?>
<stuMessages xmlns:xsi="http://www.w3.org/2001/XMLSchema-instance"
xsi:noNamespaceSchemaLocation="http://cody.glpconnect.com/XSD/StuMessage_Rev1_0_1.xsd"
timeStamp="12/07/2012 18:08:24 GMT" messageID="afa9ca80215810058​7ccfceb59d216" >
  <stuMessage>
    <esn>1-121198</esn>
    <unixTime>1343412503</unixTime>
    <gps>N</gps>                                                             602
    <payload length="27" source="pc"
    encoding="hex">0x012EBBE2BB2BB000112233445566778899AA1BABC0ABC1ABC2FE00
    </paylod>
  </stuMessage>
</stuMessages>
```

FIG. 6B

```
                                                                             603
0x 01  2E BB E2 BB 2B B0  00 11 22 33 44 55 66 77 88 99 AA  1B      AB   C0   AB   C1   AB   C2  FE
hdr|   latitude longitude |msg                              |CntPerHr|TotalCounts|degC|Analog0|Analog1|Analog2|Inputs
```

FIG. 6C